United States Patent Office 3,197,782
Patented July 27, 1965

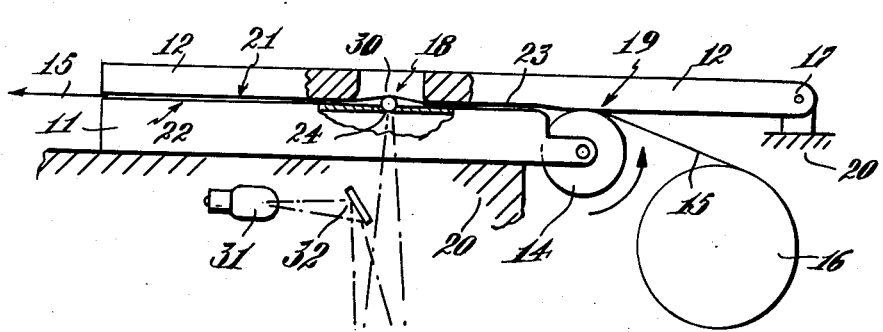

3,197,782
OPTICAL RECORDING SYSTEM
Donald E. Williamson, Miami, Fla., assignor to Cordis Corporation, Miami, Fla., a corporation of Florida
Filed Dec. 27, 1961, Ser. No. 162,517
10 Claims. (Cl. 346—109)

The field of this invention is signal recording apparatus of the type wherein a light beam is moved, such as by means of a galvanometer mirror, over light sensitive material, usually transversely of a moving strip carrying a photographic coating.

A small and well defined recording light spot is desirable in such apparatus, and this spot should be especially narrow in the travel direction of the recording material while its width is less critical in the sweep direction perpendicular thereto. Heretofore, this recording spot configuration together with favorable light intensity have been strived at by means of a cylinder segment lens placed transversely to the strip travel direction at some distance from the recording surface such as to focus thereon an image of the lamp narrowed in that direction. Such arrangements require rather cumbersome strip guidance devices for establishing the optical distances involved, and they are often unsatisfactory with regard to the recording spot characteristics.

Objects of the invention are to provide continuously secure and accurate location of the recording material on the sweep line of the recording light spot; to provide an optimally concentrated and sharp recording light spot in the recording region; and to correlate favorable recording strip guidance and favorable recording light spot characteristics in a very simple, rugged and comparatively inexpensive and yet permanently accurate and reliable manner.

The substance and nature of the invention can be briefly summarized as to the characteristic aspects thereof as involving, within an instrument system of the type employing an indicator light beam moved by a mirror which is part of an imaging system projecting a recording light spot, a rod shaped, effectively cylindrical lens, also part of the imaging system, whose axis is transverse of the motion of recording material and which lens extends into the path of this material such as to provide close contact therewith along a peripheral region which is swept by the recording light spot when the beam is moved by the instrument system. In an important optical aspect of the invention, the cylinder lens, at least so far as optically effective for purposes of the invention, is circular, preferably constituted by a complete circular cylinder of a material so selected that, with given radius and index of refraction of the cylinder and with given distance therefrom of an aperture stop, it forms an image of the stop at the recording region for rendering the scanning spot sharply narrow in the direction of travel of the recording material; in a related aspect an image of the light source also appears at this recording region. In this manner, optimal light intensity is provided while the width of the recording spot in the travel direction is considerably reduced which significantly improves the resolutions of the final record.

In a practically important optical aspect of the invention, the light from an appropriately concentrated light source is directed toward a galvanometer or other signal defining swinging mirror whose frame defines the above mentioned aperture and which is arranged behind an objective lens whence the light passes again through the objective lens toward the cylindrical lens which is in contact with the recording surface. The optical properties of this system are preferably so chosen that the light between objective lens and mirror (that is effectively between two identical lenses symmetrical to the mirror and aperture plane) is essentially collimated, and that the light source is focused, similar to the aperture, on the recording region of the cylindrical lens.

In a practically important mechanical aspect of the invention, a strip of recording material is pushed through a gap between two plates one of which has a transverse slot whereas the other holds the cylindrical lens which somewhat projects into the slot; the strip is held down by the transverse edges of the slot and deviated into the slot by the cylinder so that, due to the stiffness of the strip, the latter is intimately but with only slight friction contacted with and guided over the transverse recording region of the cylinder whereon aperture and light source are focused.

It will become apparent from the following optical exposition that those portions of the cylinder lens which do not have an optical function need not necessarily have a circular section but could for example be flat where joined to the support or non-circularly curved at the guiding region. Only the guiding region which contacts the sensitive material and the diametrically opposite optically refracting region need to be curved and only the refracting region need be circular.

These and other objects, inventive aspects and advantageous results of the invention will appear from the following description of its principle and mode of operation and of a practical embodiment illustrating in detail its novel characteristics.

The description refers to a drawing in which

FIG. 1 is a schematical side elevation, partly in section, of a recording galvanometer;

FIG. 2 is an enlarged plan view showing the mounting of the cylindrical lens according to the invention;

FIG. 3 is a section on line 3—3 of FIG. 2; and

FIG. 4 is a diagram illustrating optical characteristics of apparatus according to the invention, the diameter of the cylinder lens being considerably exaggerated as compared to the object distance.

The galvanometer recorder according to the invention shown in FIGS. 1 to 3 has a table 11 to which a weighted hold-down plate 12 is suitably fixed while permitting access to the table and vertical play, such as by way of a hinge 17 on a frame or housing 20 to which the table is fixed. By means of a transport roll 14, driven by suitable motor means in the direction indicated, a strip 15 of photographically sensitive paper is drawn from a supply roll 16 in the manner to be described. The hold-down plate 12, hinged at 17 on a supporting structure 20 as mentioned before, has a transverse slot 18 at the recording region. This hold-down plate has a portion 19 which pinches the paper strip 15 against the transport roll 14 but is thinner beyond the nip at 19 such that its face 21 clears the face 22 of the table 11. The gap 23 between table and plate must be wide enough to permit the recording strip to slide easily therein.

The table 11 has a central transverse slit 24 shaped to fit a cylindrical lens 25 made of suitable material to be described hereinbelow and cemented to the table at the edges 26 and 27. This construction completely closes the slit 24 which prevents unwanted radiation from reaching the paper adjacent to the cylindrical lens. Fastening of the lens by cement along narrow regions near a horizontal plane through its axis is permissible because these portions of the lens do not have an optical function. As previously mentioned these regions need not be cylindrical. The lens 25 extends radially through the slot 18 of the hold-down plate into the path of the paper strip 15 as defined by the gap 23, transverse of the axis of lens 25.

The recording strip 15 is fed into the lens slot, sensitive side down, as follows. The feeding transport roll 14 pulls the paper strip off the supply reel 16 by means of the nip 19 where the plate 12 pinches it against the roll 14. As mentioned above, to the left of nip 19 the table and hold-down plate are permanently spaced apart far enough so that the paper will slide easily between them. The paper strip 15 is kept in contact with the lens 25 at its farthest projecting region 30 which extends into the path of the paper, by way of contacting with its opposite side the guiding edges 28, 29 of the hold-down plate slot 18, the natural longitudinal stiffness of the paper recording strip being taken advantage of. While this simple expedient according to the invention of keeping the lens in contact with the paper due to the latter's deviation between lens region 30 and the guiding or hold-down edges 28, 29 of the hold-down plate is very effective, the same purpose could be obtained by different although more complex expedients such as a flat shoe or a rubber covered hold-down roller. The strip is taken up by any convenient means.

The optical system herein used employs a concentrated filament lamp 31 having emission characteristics suitable for the light sensitive medium applied to the recording strip 15. In the effective axis of the lamp are a deflecting mirror 32 at approximately 45° to the lamp axis, an objective lens 33, galvanometer mirror 34, and the above described cylindrical lens 25. The objective lens 33 is passed twice by the light from the lamp, as shown in FIG. 4. The objective lens 33 is placed as close to the galvanometer mirror as practical, with the lamp approximately in the principal focus of the objective lens 33 so that the light rays are essentially parallel between the lens and the galvanometer mirror, and such that the lamp imaged at the paper contacting region 30 of the cylindrical lens 25 at approximately 1:1 magnification. The frame of the galvanometer mirror 34 which constitutes an aperture as indicated in FIG. 4, is imaged in the same region as will be discussed in detail below.

The galvanometer mirror 34 is pivotally mounted on the armature 35 of the galvanometer 36. Motion of the galvanometer mirror about its axis in response to electrical signal impulses fed to the galvanometer coil will cause the image of the lamp to move in accordance therewith, and the light spot formed by the image of the lamp will scan a narrow line on the paper where it bears against the upper peripheral region 30 of the cylindrical lens 25. The lamp image moves back and forth in a plane perpendicular to the plane of the light sensitive paper strip 15 as the latter moves past the sweep line and a curve will be recorded on the paper respresentative of the electrical signal impulses as a function of the paper movement.

As previously mentioned, in apparatus of this type it is very important that the recording light spot should be as intense and small as possible, and it should also be sharply defined to provide adequate resolution of the recorded curve. It is particularly important to reduce the width of the image in the direction of motion of the recording paper, this dimension being particularly significant with regard to the resolution of the record even if the trace remains broad in the direction perpendicular to the motion of the paper. The previously mentioned conventional solution of this problem is improved according to the present invention with regard to optical properties as well as simplicity of construction by using a circular cylinder surface, and by locating a particularly favorable image of the lamp filament at the surface of the cylinder at the region where the paper passes over it. The provisions for this purpose will now be described with references to FIG. 4 which is a development of the optical system as shown in FIG. 1.

It will be noted that in FIG. 4 the aperture 39.1 is constituted by the mirror frame 39 of FIG. 1 and that the lenses 33.1 and 33.2 together correspond to the single lens 33 of FIG. 1 which, due to the reflection at galvanometer mirror 34, constitutes a double lens system as indicated. The lens 25 being cylindrical, the width of the scanning spot in the direction perpendicular to the direction of paper travel, or parallel to the axis of lens 25, is independent of this guiding lens. However the scanning spot dimension in the direction of paper travel depends on the curvature and index of refraction of the cylindrical lens together with the location and size of the aperture stop of the optical system, in this case the mirror frame 39. The image character in this critical dimension is favorably controlled according to the invention as follows.

The basic conjugate foci formula for light refraction at a surface dividing two media of different index of refraction is $n/q - n'/p = (n-n')/r$. In the present instance, and referring to FIG. 4, $n'=1$ and $p \gg q$ so that $n/q = (n-1)/r$ or $q = nr/(n-1)$. If the refracting surface of lens 25 of radius $r$ is desired to image a beam entering it from a region next to objective lens 33, on its opposite region 30, then $q=2r$ which inserted in the above formula furnishes $2r = nr/(n-1)$ or $n=2$. Thus, where as in the present instance, the object distance is comparatively large as compared with the diameter of the cylindrical lens, this diameter disappears from consideration and if the cylindrical lens is made of material with an index of refraction equal to two, the image of the aperture 39 will be effectively at 30, the region of contact between cylinder lens and recording strip. Needless to say this ideal condition will prevail only in the direction in which the cylinder is effective, namely in the direction of strip travel, perpendicular to the cylinder axis. In this critical direction the size of the image will be determined by the physical size of the aperture stop which can be chosen accordingly. It will now be evident that similar considerations apply to the imagery of the lamp as indicated in FIG. 4. Thus, the recording light spot can be optimally determined in its critical direction. The independence of this optical arrangement from the diameter of the cylindrical lens facilitates the mechanical construction of the device and reduces its cost since exact dimensioning and mounting of the cylindrical lens are unnecessary. Further, the cylinder diameter can be selected with a view to good contact of the recording paper strip, depending on its material and the general mechanical setup of the device, apart from the extreme simplicity of guiding the strip according to the invention by means of the cylindrical lens which provides favorable optical characteristics of the recording spot and at the same time locates the strip to take best advantage thereof.

It will now be evident that the strip guiding and recording region 30 is not necessarily of circular cross section but preferably curved, whereas the diametrically opposite refracting portion indicated at 30.1 of FIG. 4 is preferably of circular cross section. The configuration of the intermediate peripheral surfaces 26.1 and 27.1 is non-critical.

In operating the galvanometer or similar device according to the invention, the recording strip is threaded from reel 16 over roll 14 with the hold-down plate 12 turned back from the table. Upon lowering the hold-down plate 12, the strip is pinched at the nip 19 and slightly but with good contact pressed against the cylindrical lens 25 by the edges 28, 29 which assures that the strip will be positively positioned on the scan line at the surface of the cylindrical lens where the optimal scanning spot is provided so that a uniformly highly solution of the record is achieved. The recordation proper takes place in conventional manner with the mirror 34 oscillating on its axis and swinging the recorder beam transverse of the progress of the recording strip 15, with the scanning spot defined as above described, independently of the position and dimension of the cylindrical lens, due to the latter's particularly selected index of refraction. Due to the contact of the cylinder 25 on both sides through its entire length at portions 26, 27, along the sides of slit 24 of the rigid table 11, it is firmly positioned without possibility of deviation and protects the sensitive side of the strip 15 against optical and mechanical damage.

It should be understood that the present disclosure is for the purpose of illustration only and that this invention includes all modifications and equivalents which fall within the scope of the appended claims.

I claim:

1. Signal recording apparatus wherein light sensitive material moves continuously along a path and a light beam projects on the material a recording spot moving along a line transversely of the path, comprising:
   a rod shaped lens means arranged in the projecting beam with its longitudinal axis parallel to said transverse line, said lens means extending into said path with a region where it can contact said moving material and deviate it from said path, and having at the regions of contact and diametrically opposite thereto curved surface portions, said opposite portions being essentially circular; and
   sensitive material guiding means cooperating with said lens means to hold the material in contact with the lens means substantially at said region of contact;
   whereby the lens serves to converge the projecting beam and positively to position the sensitive material for recording.

2. Apparatus according to claim 1 wherein said lens means has an index of refraction of approximately two, whereby an object at a distance appreciably greater than two times the effective radius of curvature at said opposite surface portions is by the light beam entering at, and refracted by the said opposite surface portion focused essentially at the contact region.

3. Apparatus for recording signals on a light sensitive strip, which is continuously fed and guided lengthwise along a path, with a light beam projecting on the strip a recording spot moving along a scanning line transverse of the feed direction, comprising:
   an effectively cylindrical lens in said beam with its longitudinal axis parallel to said transverse line;
   an objective lens and an aperture stop adjacent thereto in said beam and spaced from said cylindrical lens a distance appreciably greater than the optically effective diameter of said cylindrical lens;
   said cylindrical lens extending with a curved portion radially into said path so as to deviate the strip and to establish contact therewith at a recording region substantially at said transverse line, and the index of refraction and radius of the light receiving portion of said cylindrical lens being selected such as to image said aperture stop on said recording region;
   whereby the cylindrical lens serves positively to position the strip substantially at said transverse scanning line where the aperture is imaged to provide a recording spot that is narrow and well defined in the strip feeding direction.

4. Apparatus according to claim 3 wherein said cylindrical lens has along said scanning line an essentially complete circular cross section.

5. Apparatus for recording signals on a light sensitive strip which is continuously fed and guided lengthwise along a path, comprising:
   a light source;
   an objective lens system for projecting said source on a line substantially in, and transverse of the feed direction of, said strip;
   an aperture stop adjacent said objective lens system; and an effectively cylindrical lens between said objective lens system and said strip,
      having a longitudinal axis parallel to said transverse line,
      extending radially into said path so as to deviate from the path and to curve the strip and to establish contact therewith at a recording region substantially at said transverse line,
      the index of refraction of said cylindrical lens being selected such as to image said aperture on said recording region; and
      said light source being placed at the principal focus of said objective lens system such as to be focused through said cylindrical lens essentially on said transverse line;
   whereby the cylindrical lens serves positively to position the strip substantially at said transverse line where the aperture is imaged to provide a recording spot of essentially concentrated light that is narrow and well defined in the strip feeding direction.

6. Apparatus for recording signals on a light sensitive strip, comprising:
   means for continuously guiding the strip on a feeding path; said guiding means including
   a hold down plate on one side of said strip, having a slot transverse thereto whereinto the strip is free to deviate,
   a table extending along the feeding direction on the other side of said strip and having a slit transverse thereto opposite said slot,
   an effectively cylindrical lens means extending into said slit so as to deviate the strip from the table into said slot,
   means for holding the strip in contact with the lens along a transverse line; and
   means for projecting a light beam on the strip at said transverse line, through said cylindrical lens means;
   whereby the lens means serves to converge the beam towards the transverse line and positively to position the strip thereon.

7. Apparatus according to claim 6 wherein said hold-down plate forms with said table a gap for the strip and said slot has two parallel hold-down edges one on each side of said lens means, with the lens means extending beyond the gap whereby the lens means deviates the strip from its path as it emerges from the gap at one edge, passes over the lens means and returns to the gap at the other edge.

8. Apparatus for recording signals on a light sensitive strip comprising:
   means for continuously moving and guiding the strip on a feeding path, including a strip supporting table extending along the feeding path and having a slit transverse thereto and a hold-down plate having a slot parallel to said table slit, said slot having hold-down edges one on each side of the lens means;
   means for projecting a light beam on the strip, scanning it on a line transverse of the direction of strip feed, including
      a light source,
      swinging signal responsive mirror means forming an aperture stop and arranged for reflecting said beam from said source towards said slit, and
      an objective lens between said source and said mirror means and with its principal focus essentially at the source such that the rays of the beam are substantially parallel between the objective lens and the mirror means; and
   effectively cylindrical lens means extending into the feeding path at said table slit for contacting the strip along said transverse line to deviate it into said slot, and for imaging said aperture stop at said transverse line;
      whereby the cylindrical lens means serves to converge the beam toward the transverse line and positively to position the strip thereon.

9. Apparatus according to claim 8 wherein said lens means has an index of refraction of substantially two, and is spaced from said objective lens a distance greater than the optically effective diameter of said lens means, whereby the converging effect of the lens means is independent of its diameter.

10. Apparatus according to claim 8 wherein said slit of the table has two opposite edges to which two axially extending opposite regions of said lens means are secured, whereby the slit is at the sides of the lens means mechanically and optically closed.

References Cited by the Examiner

UNITED STATES PATENTS

| 1,942,059 | 1/34 | Hathaway | 346—109 |
| 2,313,091 | 3/43 | Renner | 346—33 |
| 2,436,148 | 2/48 | Maurer | 346—109 X |
| 2,968,228 | 1/61 | Merritt | 88—57 |

LEYLAND M. MARTIN, *Primary Examiner.*

GRANVILLE Y. CUSTER, LEO SMILOW, *Examiners.*